UNITED STATES PATENT OFFICE.

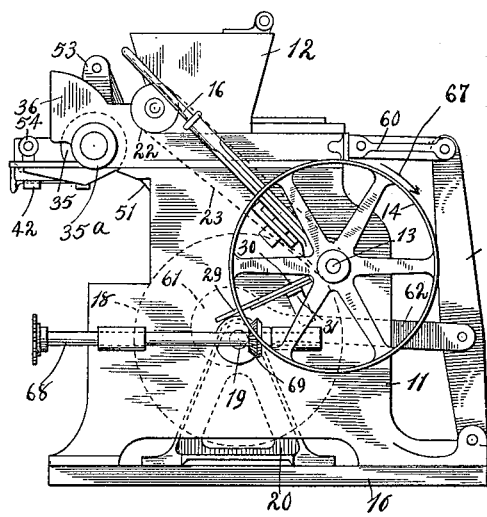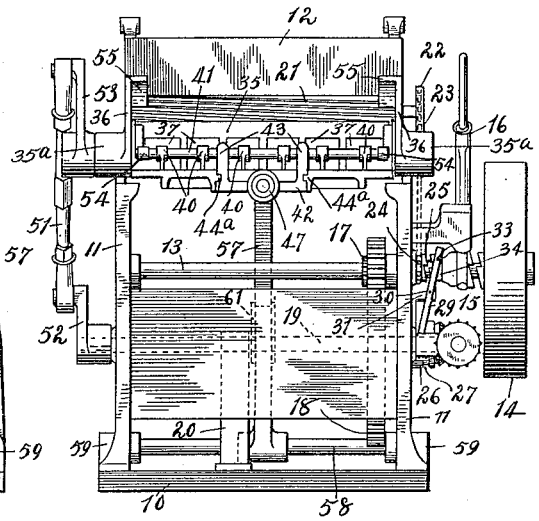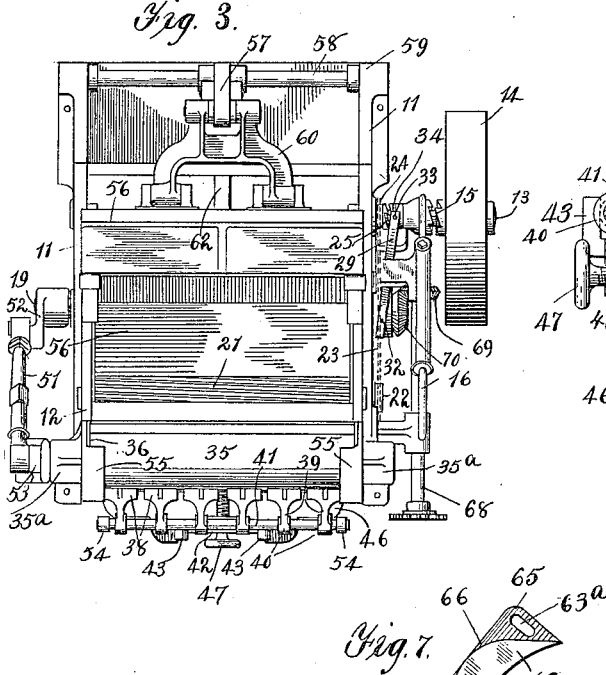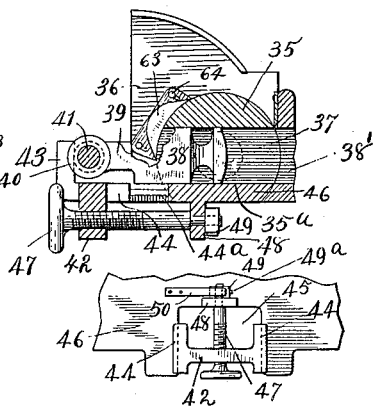

PHILIP F. CARROLL, OF JOLIET, ILLINOIS, ASSIGNOR TO CHAMPION MACHINERY COMPANY, OF JOLIET, ILLINOIS, A CORPORATION OF ILLINOIS.

DOUGH-DIVIDER.

1,080,890.

Specification of Letters Patent. Patented Dec. 9, 1913.

Application filed December 6, 1909. Serial No. 531,625.

*To all whom it may concern:*

Be it known that I, PHILIP F. CARROLL, a citizen of the United States, residing at Joliet, in the county of Will and State of Illinois, have invented certain new and useful Improvements in Dough-Dividers, of which the following is a specification.

My invention relates to bread making machinery having particular reference to dough dividing machines.

The improvements which constitute the subject matter of this application for patent are especially applicable to dough dividers of that type employing a cylinder having a plurality of pockets or chambers into which the dough is forced from the supply hopper, a series of plungers working in the pockets being employed to eject the divided pieces of dough. As ordinarily arranged, the retraction of the plungers is effected by the movement of the new supply of dough as it is forced into the pockets by the main feed piston reciprocating through the lower part of the supply hopper. It is found, however, that the excessive pressure thus exerted condenses the dough masses and expresses the gases to an extent that is injurious, producing a condition that affects the quality of the finished product.

The paramount object of the present invention is to introduce a positive plunger movement to supplement the action of the loading plunger, so as to avoid the conditions named.

Further objects are to furnish means for conveniently adjusting the stroke of the plungers for the purpose of varying the size of the loaf, and to arrange the plungers so that they may be readily removed to facilitate cleaning.

I accomplish the desired objects by means of the apparatus illustrated in the accompanying drawing, which forms a part of this application, the details of construction being disclosed in the following views:—

Figure 1 is a side elevation of a six pocket dough divider equipped with my improvements; Fig. 2 is a front elevation; Fig. 3 is a top plan view; Fig. 4 is a fragmentary view showing the chambered cylinder in transverse section; Fig. 5 is a partial view showing the under side of the plunger adjusting mechanism, with a portion of the supporting plate; Fig. 6 is a view of one form of clutch operating cam, and Fig. 7 is a view of the cam block detached.

Referring to the details of the drawing, the numeral 10 indicates the base, and 11 the supporting frame of a dough dividing machine surmounted by the usual supply hopper 12. The main shaft 13 of the machine extends transversely through the frame and has one of its ends projecting, and upon this is mounted a loose driving pulley 14, which is put into and out of connection with its shaft by means of a clutch 15, operated by a lever 16. Upon said shaft is located a pinion 17 which imparts motion to a comparatively large gear 18, mounted upon a countershaft 19, journaled in the frame sides and supported near the middle by a bracket 20. Arranged transversely in the hopper 12 is a serrated or roughened feed roller 21, having a sprocket 22 upon a projecting end of its shaft. This sprocket is connected by a chain 23 with a smaller sprocket 24, loosely mounted upon the main shaft 13, and arranged to be thrown into and out of connection with said shaft by means of a clutch 25, automatically operated from the countershaft in the following manner:—Upon a projecting end of said countershaft is mounted a collar 26 having a peripheral cam groove 27 (Fig. 6) which lies in the same plane throughout the greater part of its circumference but for a suitable extent is deviated, as indicated at 28. Extending between this cam and the clutch 25 is a lever 29 pivoted at 30 to a bracket 31 secured to the frame. The cam end of this lever is supplied with a pin 32 which engages the cam groove 27, and the clutch end of said lever has a pin 33, engaging a groove 34 in said clutch. This arrangement will impart a regular intermittent movement to the said feed roller, the purpose being to avoid action of this roller during such time as the feed plunger, hereinafter described, is in its forward position, where it will interfere with the downward feeding of the dough, and were the feed roller allowed to rotate under these conditions it would tend to compress and tear the dough mass which would have an injurious effect upon its quality.

Extending transversely across the machine directly in front of the feed hopper is a chambered roll or rock cylinder 35, having its ends journaled in boxes 35ª attached to frame extensions 36. This rock-cylinder is pierced by a series of rectangular chambers 37, which communicate with the cavity 38' of the feed or supply hopper 12 when the said cylinder is in its initial position, which is that shown in Fig. 4. Each pocket or chamber 37 is occupied by a closely fitting plunger 38, having a stem 39, provided at the end with an eye or collar 40. The plungers are connected by a rod 41 which passes through the eyes 40, and are retained in their respective chambers by a block or yoke 42, having lugs 43 which extend upwardly in front of the connecting rod 41. The said block or yoke 42 is provided with extensions 44 (see Fig. 5) grooved upon the outer side to receive ribs 44ª upon the lateral margins of an opening 45, formed in a plate 46. One side of the chambered cylinder 35 is flattened, as indicated at 35ª, and the said plate 46 is secured to the flat face thus formed and projects forward as shown in Fig. 4. The said block 42 is fitted to slide upon the said ribs 44ª and is adjustably retained in position by a hand screw 47 which has a threaded engagement with the body of the block or yoke, and has its end reduced to pass through a depending lug 48 fixed on the frame plate 46. A square blank nut 49 is secured to the end of the said screw by a removable pin 49ª, and this nut is engaged by a flat spring 50 fixed to the plate 46, which permits the screw to be turned when sufficient power is applied thereto, but locks the screw in position when adjusted. It will be understood that when the block 42 is moved inward or outward by turning the screw 47, the lugs 43 will limit the outward movement of the connected plungers, and consequently decide the weight of the divided portions of dough which is determined by the capacity of the pockets or chambers when the plungers are in their initial positions.

The cylinder 35 is partially rotated, or rocked in its bearings by a crank rod 51, connected at its lower end to a crank 52, mounted on one end of the countershaft 19, and at its upper end, to a crank 53 attached to the trunnion of the said cylinder 35. The throw of the cylinder crank 53 is greater than that of the crank 52, their relation being such that while the crank 52 revolves through one half a revolution the upper crank moves over an arc of 90 degrees thus giving the cylinder 35 a quarter turn, and consequently the last half of the revolution of the crank 52 will reverse the movement of the crank 53 and carry the said cylinder back to its initial position, with the plungers lying horizontally. The ends of the plunger connecting rod 41 carry anti-friction rollers 54, which engage the under surfaces of curved flanges 55 forming part of or attached to the frame extensions 36, as the cylinder is rocked, and as the curve of the flanges is eccentric to the cylinder axis, their function is to drive the plungers gradually through their respective chambers as the cylinder turns, so that by the time the vertical position is reached the rear ends of the plungers will have passed through the cylinder until they are flush with the periphery.

It is necessary to retract the plungers on the reverse movement of the cylinder, and this has heretofore been accomplished entirely by the pressure of the dough as it is forced into the pockets 37, by the action of a feed piston 56 (Fig. 3) adapted to move horizontally through the hopper chamber beneath the feed roller. This piston is operated by a vertical lever or connecting rod 57 arranged in the median line at the rear of the machine, having its lower end secured to a rock shaft 58, journaled at the ends in boxes 59, and connected at the upper end to the said piston 56 by a pivoted yoke 60. The rod 57 receives motion from the countershaft 19 through an eccentric 61, connected to the said rod by an arm 62.

It has been found that the pressure required to restore the plungers 38 to their retracted positions by forcing the dough into the pockets 37 is injurious as previously mentioned, and in order to eliminate this objectionable feature I provide adjustable cam blocks 63, secured to the inner faces of the frame extensions 36, by bolts 64, which pass through slots 63ª in integral flanges 65. These cams are furnished with curved faces 66, with which the rollers 54 engage during the reverse movement of the said cylinder 35, and initially and partially retract the said plungers, the completion of their movement being accomplished by the action of the feed piston 56. While the cam-action is available only at the beginning of the reverse stroke of the plungers, the partial vacuum started by said movement causes a suction on the dough which draws it into the pockets and relieves it from excessive compression by the piston.

The functions of the various mechanisms having been stated in connection with the detailed description of their construction, a general description of the operation of the machine will be sufficient to give a clear understanding of the apparatus as a whole. The drive pulley 14 having been connected with an available supply of power, the clutch 15 is thrown into gear by means of the lever 16. The main shaft will then rotate in the direction of the arrow 67, Fig. 1 and the pinion 17 will impart a comparatively slow motion to the countershaft 19 through the larger gear 18. The eccentric 61 will reciprocate the piston 56, while at the same time the pocket cylinder, 35 will be rocked in the manner described, the respective movements being so timed that the cylinder will rock from its initial position simultaneously with the retraction of the said piston, and at this time the feed roller 21 will revolve so as to crowd or feed some of the dough down in front of the receding piston. By the time the cylinder 35 has reached the limit of its forward rocking movement, the plungers 38 will have pushed the dough masses clear of the cylinder, and the portions of dough thus dumped will fall upon an endless apron (not shown) said apron being operated by a shaft 68 which receives its motion from the countershaft 19 through beveled gears 69, 70. The piston 56 will now move forward and the cylinder 35 rock back to its initial position. The advancing piston will force the dough which has been fed down in front of it by the roller 21 into the pockets or chambers and against the plungers, tending to force them outwardly, while the action of the cams 63 is timed slightly in advance of this piston movement so as to produce a certain amount of suction the resulting atmospheric pressure aiding in the process of filling the pockets. The feed roller will continue to rotate during the first part of the piston movement toward the chambered cylinder, but is thrown out of gear by the action of the cam 26 as the piston approaches the limit of its stroke and remains at rest so long as the piston is in the vicinity of the cylinder and below the feed roller, this intermittent action of the feed roller relieving the pressure on the dough.

Having thus described my invention what I claim as new, is:—

1. In a dough divider, a hopper, a roller arranged to feed the dough from said hopper, a dough feed piston arranged below said feed roller, a main drive shaft, and means for intermittently operating said feed roller, said means comprising a gear loosely mounted on said shaft and connected with said roller, a clutch on the drive shaft adapted to engage the gear, a countershaft connected with the drive shaft, and means on the countershaft for intermittently operating said clutch.

2. In a dough divider, a hopper, a roller arranged to feed the dough from said hopper, a dough feed piston arranged below said feed roller, a drive shaft, and means for intermittently operating said feed roller, said means comprising a sprocket loosely mounted on said shaft, a chain connecting the sprocket with the feed roller, a clutch on the drive shaft adapted to engage the gear, a countershaft connected with the drive shaft, a cam on the countershaft, and a lever pivoted on the frame of the machine and operatively connecting the cam with said clutch.

In testimony whereof I affix my signature in the presence of two witnesses.

PHILIP F. CARROLL.

Witnesses:
M. A. MILORD,
F. BENJAMIN.

Copies of this patent may be obtained for five cents each, by addressing the "Commissioner of Patents, Washington, D. C."